(12) United States Patent
Soldner et al.

(10) Patent No.: US 9,862,254 B2
(45) Date of Patent: Jan. 9, 2018

(54) FUNCTIONALLY OPTIMIZED FIBER COMPOSITE COMPONENT AND METHOD FOR THE PRODUCTION THEREOF

(71) Applicant: Bayerische Motoren Werke Aktiengesellschaft, Munich (DE)

(72) Inventors: Florian Soldner, Brannenburg (DE); Wolfgang Gruber, Landshut (AT); Matthias Zeidler, Dachau (DE); Markus Vallerius, Munich (DE); Ralf Poggenborg, Altheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/659,951

(22) Filed: Mar. 17, 2015

(65) Prior Publication Data
US 2015/0183305 A1 Jul. 2, 2015

Related U.S. Application Data

(63) Continuation of application No. PCT/EP2013/068262, filed on Sep. 4, 2013.

(30) Foreign Application Priority Data

Sep. 19, 2012 (DE) .......... 10 2012 216 727

(51) Int. Cl.
*B60J 5/00* (2006.01)
*B60J 5/04* (2006.01)
(Continued)

(52) U.S. Cl.
CPC ......... *B60J 5/048* (2013.01); *B29C 45/14467* (2013.01); *B29C 70/08* (2013.01);
(Continued)

(58) Field of Classification Search
CPC ..... B60J 5/107; B60J 5/048; B29C 45/14467; B29C 70/08; B29C 70/30; B29C 70/48; B29C 70/887; B29D 99/001
(Continued)

(56) References Cited

U.S. PATENT DOCUMENTS 3,414,455 A 12/1968 Twomey, Jr. et al.
5,874,136 A 2/1999 Michna et al.
(Continued)

FOREIGN PATENT DOCUMENTS

CN 101020361 A 8/2007
CN 101068668 A 11/2007
(Continued)

OTHER PUBLICATIONS

English translation of Chinese Office Action issued in counterpart Chinese Application No. 201380046931.9 dated Jan. 27, 2016 (nine (9) pages).
(Continued)

*Primary Examiner* — Joseph D. Pape
(74) *Attorney, Agent, or Firm* — Crowell & Moring LLP

(57) ABSTRACT

A fiber composite component is provided, particularly for a vehicle structure, having a fiber structure which includes at least one fiber layer, wherein at least one of the at least one fiber layers is formed from a number of pre-formed fiber mats, and a first pre-formed fiber mat has a greater fiber mat thickness than a second pre-formed fiber mat from the number of pre-formed fiber mats of the at least one fiber layer. A method for producing a corresponding fiber composite component is also provided.

14 Claims, 1 Drawing Sheet

(51) Int. Cl.
 B29C 70/48 (2006.01)
 B29C 70/88 (2006.01)
 B29C 70/08 (2006.01)
 B29C 70/30 (2006.01)
 B29C 45/14 (2006.01)
 B29D 99/00 (2010.01)
 B29L 31/30 (2006.01)

(52) U.S. Cl.
 CPC ............. *B29C 70/30* (2013.01); *B29C 70/48* (2013.01); *B29C 70/887* (2013.01); *B29D 99/001* (2013.01); *B29L 2031/3055* (2013.01)

(58) Field of Classification Search
 USPC .......................................... 296/146.5, 146.6
 See application file for complete search history.

(56) References Cited

U.S. PATENT DOCUMENTS

| | | | | |
|---|---|---|---|---|
| 7,080,712 | B2* | 7/2006 | Tsuiki | ................... B60R 13/083 181/204 |
| 8,701,825 | B2* | 4/2014 | Yamamoto | ............ B60R 13/083 181/284 |
| 2006/0144627 | A1 | 7/2006 | Czerny et al. | |
| 2007/0292669 | A1 | 12/2007 | Yamasaki et al. | |
| 2010/0066121 | A1* | 3/2010 | Gross | ................... G10K 11/162 296/146.5 |

FOREIGN PATENT DOCUMENTS

| | | |
|---|---|---|
| DE | 103 32 172 B3 | 10/2004 |
| DE | 10 2007 000 579 A1 | 4/2009 |
| DE | 10 2010 028 247 A1 | 10/2011 |
| EP | 1 547 756 A1 | 6/2005 |
| EP | 1 829 661 A1 | 9/2007 |
| WO | WO 2004/078461 A1 | 9/2004 |
| WO | WO 2011/020841 A1 | 2/2011 |

OTHER PUBLICATIONS

International Search Report (PCT/ISA/210) dated Dec. 16, 2013, with English translation (Five (5) pages).
German Search Report dated May 2, 2013, with English translation (Eleven (11) pages).
Chinese Office Action issued in counterpart Chinese Application No. 201380046931.9 dated Mar. 8, 2017 with English translation (15 pages).

* cited by examiner

Section (A-A)

FUNCTIONALLY OPTIMIZED FIBER COMPOSITE COMPONENT AND METHOD FOR THE PRODUCTION THEREOF

CROSS REFERENCE TO RELATED APPLICATIONS

This application is a continuation of PCT International Application No. PCT/EP2013/068262, filed Sep. 4, 2013, which claims priority under 35 U.S.C. §119 from German Patent Application No. 10 2012 216 727.7, filed Sep. 19, 2012, the entire disclosures of which are herein expressly incorporated by reference.

BACKGROUND AND SUMMARY OF THE INVENTION

The invention relates to a fiber composite component, in particular for a vehicle structure, having a fiber structure which comprises at least one fiber layer, wherein at least one of the at least one fiber layers is formed from a number of pre-formed fiber mats. The invention also relates to a method for the production of the fiber composite component.

Components made of fiber composite material are increasingly being used in order to reduce the weight of motor vehicles. A frequently used method for producing these fiber composite components is so-called Resin Transfer Molding (RTM for short). Here, fiber mats, such as overlay structures, matrices and meshes made of glass or carbon fibers, are pressed into a defined spatial form in a forming process. The fiber mats which are pre-formed in this way are referred to as so-called "preforms" and are subsequently placed in a heatable injection mold into which a matrix is injected for impregnating the fiber mats.

In order to achieve a form stability of the fiber mats in the pre-forming step, they are initially blanked out corresponding to a required contour, and a binding agent (usually plastic powder), for example, is applied to them. In a subsequent pressing and heating operation, the fiber mats are pressed into the required shape in a forming tool and the binding agent is simultaneously melted. After the binding agent has cooled and set, the individual fibers of the fiber mat adhere in such a way that the fiber mat retains the impressed form even when it is subsequently removed from the forming tool. In spite of the adhesion, a substantially flexible and open-pored form of the pre-formed fiber mat is retained, thus enabling the injected matrix to penetrate and impregnate the fiber mat as completely as possible.

A thickness of the fiber mats used is usually designed for the most heavily loaded regions of the component to be produced and extends continuously through the whole component. Consequently, the highest load component to be expected determines the wall thickness of the fiber mat for the whole component.

The fiber composite components produced in this way usually have a lower weight than comparable metal components but are expensive with regard to production and material costs.

It is therefore the object of the invention to improve fiber composite components of this kind as well as an associated production method, particularly with regard to the component weight and the manufacturing costs.

This and other objects are achieved by a fiber composite component and a method of producing the same, particularly for a vehicle structure, having a fiber structure which comprises at least one fiber layer, wherein at least one of the at least one fiber layers is formed from a number of pre-formed fiber mats. A first pre-formed fiber mat has a greater mat thickness than a second pre-formed fiber mat from the number of pre-formed fiber mats of the at least one fiber layer.

Accordingly, a fiber composite component having a fiber structure which comprises at least one fiber layer is provided, in particular for a vehicle structure. At least one of the at least one fiber layers is formed by a number of pre-formed fiber mats.

Here, a first pre-formed fiber mat has a greater fiber mat thickness than a second pre-formed fiber mat from among the number of pre-formed fiber mats of the at least one fiber layer.

Within the framework of this description, the thickness of a fiber mat is understood to mean an appropriate height of the substantially flat fiber mat. Preferably, in spite of different thicknesses, the fiber mats used have the same fiber volume density. This means that, in this case, a thicker fiber mat has a greater number of fibers or fiber rovings in the height direction than a thinner fiber mat.

For example, the fiber composite component includes a single fiber layer which is impregnated with a matrix as part of a production method, such as, for example, the described RTM method. As a rule, the fiber layer extends in a planar manner through the whole component or at least through one or more component sections to be reinforced. Naturally, instead of a single fiber layer, a plurality of fiber layers which, according to the description, each comprise a plurality of fiber mats of either the same or different thickness, can be provided in the same regions or in different regions of the fiber composite component.

According to an embodiment, each of these fiber layers is formed by the number of pre-formed fiber mats, wherein individual ones of the fiber mats have a different fiber mat thickness compared with the other fiber mats of the respective fiber layer. This enables fiber mats with greater fiber mat thickness to be provided at certain points of the fiber composite component and fiber mats with lesser fiber mat thickness at other points within the same fiber layer. Accordingly, the fiber layer does not have a constant fiber mat thickness in its direction of extension over the component but rather has a locally varying fiber mat thickness.

This results in the advantage that, with a required arrangement of these fiber mats, a fiber mat thickness, which is constant throughout and which would otherwise have to be designed for the maximum load values of the fiber composite component and provided in the same thickness in the less heavily loaded regions, can be dispensed with.

On the one hand, this measure enables fiber material, which is expensive and complex to produce, to be saved and, on the other, a weight of the produced fiber composite component to be reduced. An optimum weight of the fiber composite component can therefore be provided by locally thinner wall thicknesses, which in this way enable lower material costs.

According to a further embodiment, the at least one fiber layer comprises a matrix layer, an overlay structure layer, a mesh layer and/or a unidirectional or multidirectional fiber layer. These are also understood to mean fiber fleeces. Here, an appropriate layer is always understood to mean a structurally connected arrangement of fiber material (single fibers or so-called rovings), in particular also so-called stacks with a plurality of fiber planes which are connected to one another. Any fiber suitable for component reinforcement, in particular carbon, glass, aramid or natural fibers and mixtures thereof, can be used as the fiber material.

Preferably, the pre-formed fiber mats are arranged next to one another in a planar manner in order to form the at least one fiber layer. Figuratively speaking, this means that the pre-formed fiber mats are laid next to one another or joined in the manner of a "mosaic" such that the fiber mats form the fiber layer which is as continuous as possible. In particular, the planar arrangement of the fiber mats is to be understood in such a way that the surfaces of the individual fiber mats form a common surface of the fiber layer constructed in this way which, for example, follows the spatial component shape. For example, the individual fiber mats can be connected to one another at their face sides by means of a butt joint.

According to a further embodiment, the pre-formed fiber mats, which are arranged next to one another in a planar manner, are arranged overlapping one another in mutually facing edge regions in order to form the at least one fiber layer. Accordingly, the fiber mats are not only arranged next to one another in the manner of a mosaic but also overlap in their edge regions. In spite of this overlapping, this arrangement of fiber mats is still to be understood as a common fiber layer. Here, the overlapping regions, with a possible doubling of the material, are not to be included in the consideration of the actual fiber layer and its thickness.

The overlaps enable a connection of the individual fiber mats, which is as durable as possible and which has a further increased connection strength of the fiber mats, to be achieved.

Furthermore, the fiber composite component can include a first number of force application sections, wherein a first pre-formed fiber mat has a greater fiber mat thickness in the region of at least one force application section compared with a second fiber mat of the at least one fiber layer.

Force application sections are those sections of the fiber composite component to which force is applied at least in the fitted state of the fiber composite component. Among other things, these can be fixing points of the component for fixing to other components. Especially in these force application sections, thicker fiber mats than in other sections of the component can be provided for local reinforcement.

As already described, the formed fiber layer can have a fiber mat thickness which varies over the component and is increased particularly in the force application sections. Within the framework of the overall description, the overlapping regions which may be arranged within the fiber layer are insignificant in the consideration of the thickness of the fiber layer.

In addition, the fiber composite component can include a second number of load paths which connect the force application sections to one another, wherein a first pre-formed fiber mat has a greater fiber mat thickness in the region of at least one force application section compared with a second fiber mat arranged in the region of at least one load path.

Load paths are understood to mean those regions of the fiber composite component which connect a plurality of force application sections to one another in a force-transmitting manner. For example, a first and a second force application section which is arranged remotely therefrom can be connected by way of one or more load paths. If a force is applied to one of the force application sections, then the applied force is transmitted via the load path or paths to the other force application section and through this out of the component. Other force application sections can, of course, also be provided accordingly.

According to a further embodiment, filler surfaces are arranged adjacent to the load paths and/or to the force application sections, wherein pre-formed fiber mats in the region of the filler surfaces have a lesser fiber mat thickness than the fiber mats in the region of the force application sections and/or than the pre-formed fiber mats in the region of the load paths.

Accordingly, the filler surfaces play a subordinate role for a force flow and preferably serve to provide a planar design of the component without an inherent load-bearing or force-transmitting function. As a rule, a low loading of this or these section(s) is to be assumed so that the fiber mats provided there can have a lesser fiber mat thickness than in the loaded sections of the force application sections and load paths.

This embodiment enables material and weight to be saved in a particular way at those points where, with previously known fiber composite opponents, fiber material is provided in large quantities without additional benefit.

In addition, the pre-formed fiber mats which are arranged in the region of the at least one load path can have an extension which is oriented along the load paths. Preferably, the pre-formed fiber mats concerned are designed according to the shape of the load path.

In other words, this enables the pre-formed fiber mats to be segregated taking into account the load components. The pre-formed fiber mats can be blanked out to optimize the load in such a way that they extend substantially in the direction of the load paths and, at the same time, adjacent low-load regions are not associated with this respective fiber mat. In contrast with known blanks, which are designed to be optimally cut for a least possible wastage of the fiber mats, in this embodiment, the blank is provided in such a way that the fiber mats follow the load paths as optimally as possible and are therefore optimally designed for weight and strength.

In this way, the described sections are functionally segregated to a certain extent in order to achieve as optimum a distribution of the fiber mats with the respectively locally required fiber mat thicknesses as possible. This also avoids "oversized" fiber mats in less loaded regions and only reinforces the more heavily loaded regions in that the fiber mats are pre-formed in such a way that they substantially form only the regions which are required to reinforce the fiber composite component.

For example, the fiber composite component can be designed as a door structure and/or as a vehicle frame part of a motor vehicle. A door structure of this kind can include door frames, door ribs and/or planar door elements. However, other components, in particular vehicle structural parts, can of course also be provided in this way.

Furthermore, a method is described for producing a fiber composite component having a fiber structure including at least one fiber layer. The method includes the following steps. A number of pre-formed fiber mats is provided in order to form the at least one fiber layer. The pre-formed fiber mats are inserted in an injection mold. The injection mold is closed. The pre-formed fiber mats are impregnated and cured to produce the fiber composite component, wherein a first pre-formed fiber mat has a greater fiber mat thickness than a second pre-formed fiber mat from the number of pre-formed fiber mats of the at least one fiber layer.

Preferably, the pre-formed fiber mats are arranged next to one another in a planar manner and overlap one another in mutually facing edge regions in order to form at least one fiber layer.

Preferably, the method is designed as a Resin Transfer Molding method (RTM).

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
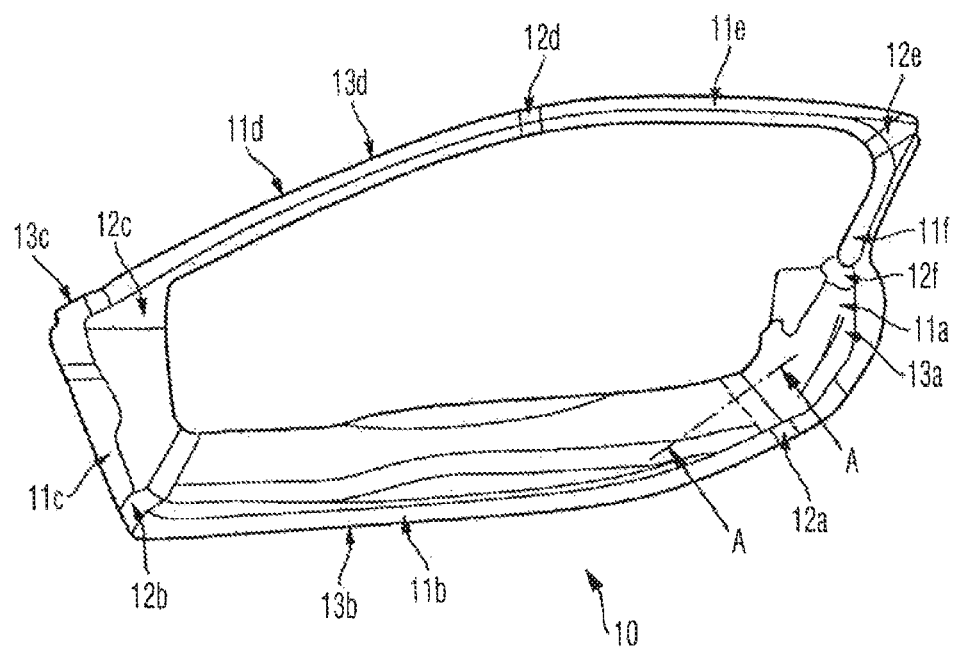
FIG. 1 is a schematic view of a door structure of a motor vehicle as a fiber composite component.

FIG. 1 shows a door structure of a motor vehicle, which door structure is designed as part of a vehicle structure and as a fiber composite component. A cross section through an overlapping section 12a of the door structure shown in FIG. 1, which is explained in more detail below, is shown schematically in FIG. 2.

Accordingly, the fiber composite component 10 has a fiber structure which, in the embodiment shown, has a fiber layer 11, wherein the fiber layer 11 is formed by a number of pre-formed fiber mats 11a-f. Here, a (first) of the pre-formed fiber mats 11a, 11c has a greater fiber mat thickness d1 than a second pre-formed fiber mat 11b or 11d-f, respectively, from the number of pre-formed fiber mats 11a-f of the fiber layer 11.

Here, the fiber layer 11 or each of the fiber mats 11a-f can comprise a matrix layer, an overlay structure layer, a mesh layer and/or a unidirectional or multidirectional fiber layer.

In addition, the pre-formed fiber mats 11a-f are arranged next to one another in a planar manner in order to form the fiber layer 11 of the fiber composite component 10. In doing so, the pre-formed fiber mats 11a-f, which are arranged next to one another in a planar manner, are arranged overlapping one another in mutually facing edge regions, forming an overlap region 12a-f respectively, in order to form the at least one fiber layer 11.

As a door structure, the fiber composite component 10 includes two force application sections 13a, 13c, wherein the pre-formed fiber mats 11a, 11c have a greater fiber mat thickness d1 in the region of the force application sections 13a, 13c compared with other fiber mats 11b, 11d-f of the fiber layer 11. The force application sections 13a, 13c are provided particularly in the hinge region of the fiber composite component 10, which is formed as a door structure, and in its lock region, as a high mechanical load is to be expected in these regions as a result of torques to be transmitted as well as tensile and compressive forces.

In addition, the fiber composite component 10 includes two load paths 13b, 13d which connect the two force application sections 13a, 13c to one another and which, here, are formed by the fiber mats 11b, 11d-f. The pre-formed fiber mats 11a and 11c respectively in the region of the force application sections 13a, 13c have a greater fiber mat thickness d1 especially compared with the fiber mats 11b, 11d-f which are arranged in the region of the load paths 13b, 13d. In this fiber composite component 10, load paths 13b, 13d are understood to mean a lower connecting strut between the two force application sections 13a, 13c and an upper window frame.

As an option, the pre-formed fiber mats 11b, 11d-f provided in the regions of the load paths 13b, 13d can also have fiber mat thicknesses d2, d2' which differ from one another. As a result, the different loads of the individual load paths as a whole and in sub-regions of the load paths can accordingly be taken into account in an optimal manner. The connecting strut formed by the fiber mat 11b is therefore significantly more heavily loaded than the top window frame so that, as well as an appropriate external form, a specific and optimum reinforcement is achieved by the different fiber mat thicknesses.

The same applies to the fiber mats 11a, 11c of the force application sections 13a, 13c, which, instead of equal thicknesses, can likewise have different thicknesses d1 and d1'.

Figure 2:
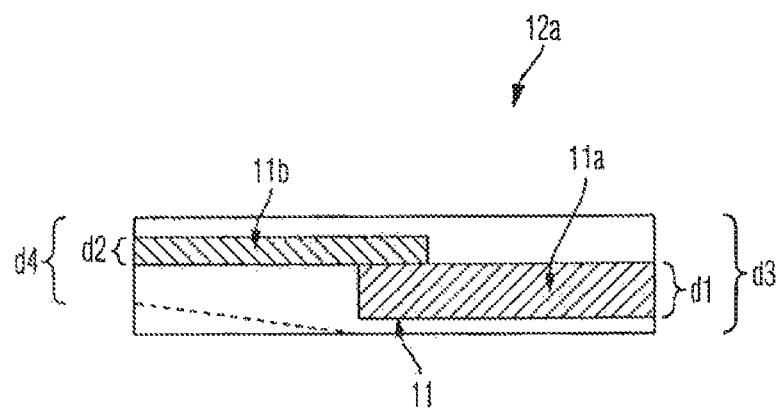
FIG. 2 is a schematic diagram of a cross section through a fiber composite component.

As shown purely schematically in FIG. 2 by means of a dashed alternative wall progression, a wall thickness d4 in the region of the thinner fiber mats, such as the fiber mats 11b, 11d-f for example, can be reduced, likewise compared with the region of the thicker fiber mats 1a, 11c with a wall thickness d3.

Filler surfaces, which are not subjected to the action of force or are only subjected to a small force, are not shown in the two figures. However, these can optionally be arranged adjacent to the load paths 13b, 13d and/or to the force application sections 13a, 13c, wherein pre-formed fiber mats in the region of the filler surfaces have a lesser fiber mat thickness than the fiber mats 11a, 11c in the region of the force application sections 13a, 13c and/or than the pre-formed fiber mats 11b, 11d-f in the region of the load paths 13b, 13d.

As can be seen from FIG. 1, the pre-formed fiber mats 11b, 11d-f which are arranged in the region of the load paths 13b, 13d have an extension which is oriented along the load paths 13b, 13d. As can be seen from the overlapping sections 12a-f, the individual pre-formed fiber mats are preferably blanked out under load-optimized aspects instead of according to geometric and waste-optimized criteria.

In this way, with the fiber composite component 10 shown, a load-optimized fiber structure can be achieved which enables weight to be kept as low as possible and, at the same time, cost-intensive fiber material to be saved and be provided at those points at which there is an appropriate load-related requirement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fiber composite panel structure of a vehicle, comprising:
    a fiber structure comprising at least one fiber layer, said at least one fiber layer being formed from a number of pre-formed fiber mats that form the panel structure; and
    a force application section, wherein
        the panel structure is a frame or a door,
        a first of the number of pre-formed fiber mats has a greater fiber mat thickness than a second of the number of pre-formed fiber mats, and
        the first pre-formed fiber mat has a first fiber mat thickness in a region of the force application section, and has a second fiber mat thickness in a region outside of the force application section, and the first fiber mat thickness is greater than the second fiber mat thickness.

2. The fiber composite panel structure as claimed in claim 1, wherein the at least one fiber layer comprises a matrix layer, an overlay structure layer, a mesh layer and/or a unidirectional or multidirectional fiber layer.

3. The fiber composite panel structure as claimed in claim 2, wherein the number of pre-formed fiber mats are arranged next to one another in a planar manner in order to form the at least one fiber layer.

4. The fiber composite panel structure as claimed in claim 1, wherein the number of pre-formed fiber mats are arranged next to one another in a planar manner in order to form the at least one fiber layer.

5. The fiber composite panel structure as claimed in claim 3, wherein the number of pre-formed fiber mats, which are arranged next to one another in the planar manner, are arranged overlapping one another in edge regions thereof in order to form the at least one fiber layer.

6. The fiber composite panel structure as claimed in claim 4, wherein the number of pre-formed fiber mats, which are arranged next to one another in the planar manner, are arranged overlapping one another in edge regions thereof in order to form the at least one fiber layer.

7. The fiber composite panel structure according to claim 1, further comprising:
at least another force application section.

8. The fiber composite panel structure as claimed in claim 7, further comprising:
a number of load paths which connect the force application sections to one another, wherein the first pre-formed fiber mat has a greater fiber mat thickness in the region of at least one force application section compared with a second fiber mat arranged in the region of the at least one load path.

9. The fiber composite panel structure as claimed in claim 8, further comprising:
filler surfaces arranged adjacent to the number of load paths and/or to the force application sections, wherein pre-formed fiber mats in a region of the filler surfaces have a lesser fiber mat thickness than pre-formed fiber mats in a region of the force application sections and/or than the pre-formed fiber mats in a region of the number of load paths.

10. The fiber composite panel structure as claimed in claim 9, wherein the pre-formed fiber mats, which are arranged in a region of the at least one load path, have an extension which is oriented along the load paths.

11. The fiber composite panel structure as claimed in claim 8, wherein the pre-formed fiber mats, which are arranged in the region of the at least one load path, have an extension which is oriented along the load paths.

12. The fiber composite panel structure as claimed in claim 1, wherein the first of the number of pre-formed fiber mats and the second of the number of pre-formed fiber mats have the same fiber volume density.

13. A fiber composite panel structure of a vehicle, comprising:
a fiber structure comprising at least one fiber layer, said at least one fiber layer being formed from a number of pre-formed fiber mats; and
a force application section, wherein
the panel structure is a door,
a first of the number of pre-formed fiber mats has a greater fiber mat thickness than a second of the number of pre-formed fiber mats, and
the first pre-formed fiber mat has a first fiber mat thickness in a region of the force application section, and has a second fiber mat thickness in a region outside of the force application section, and the first fiber mat thickness is greater than the second fiber mat thickness.

14. A fiber composite panel structure of a vehicle, comprising:
a fiber structure comprising at least one fiber layer, said at least one fiber layer being formed from a number of pre-formed fiber mats; and
a force application section, wherein
the panel structure is a frame,
a first of the number of pre-formed fiber mats has a greater fiber mat thickness than a second of the number of pre-formed fiber mats, and
the first pre-formed fiber mat has a first fiber mat thickness in a region of the force application section, and has a second fiber mat thickness in a region outside of the force application section, and the first fiber mat thickness is greater than the second fiber mat thickness.

* * * * *